US010589729B2

(12) United States Patent
Aydemir

(10) Patent No.: US 10,589,729 B2
(45) Date of Patent: Mar. 17, 2020

(54) PRESSURE-LIMITING VALVE

(71) Applicant: KNORR-BREMSE Systeme fuer Nutzfahrzeuge GmbH, Munich (DE)

(72) Inventor: Isa Aydemir, Munich (DE)

(73) Assignee: KNORR-BREMSE Systeme fuer Nutzfahzeuge GmbH, Munich (DE)

( * ) Notice: Subject to any disclaimer, the term of this patent is extended or adjusted under 35 U.S.C. 154(b) by 0 days.

(21) Appl. No.: 15/971,448

(22) Filed: May 4, 2018

(65) Prior Publication Data

US 2018/0319385 A1    Nov. 8, 2018

Related U.S. Application Data

(63) Continuation of application No. PCT/EP2016/076407, filed on Nov. 2, 2016.

(30) Foreign Application Priority Data

Nov. 5, 2015   (DE) .................. 10 2015 118 962

(51) Int. Cl.
*B60T 15/36* (2006.01)
*B60T 11/34* (2006.01)
(Continued)

(52) U.S. Cl.
CPC ............... *B60T 15/36* (2013.01); *B60T 11/34* (2013.01); *B60T 15/50* (2013.01); *F16K 17/04* (2013.01); *B60T 17/002* (2013.01)

(58) Field of Classification Search
CPC .......... B60T 15/36; B60T 11/34; B60T 15/50; F16K 17/04
See application file for complete search history.

(56) References Cited

U.S. PATENT DOCUMENTS

2009/0288722 A1* 11/2009 Ball .................. E03C 1/106
                                                          137/614.2
2012/0107062 A1    5/2012 Moraru et al.

FOREIGN PATENT DOCUMENTS

DE         1 775 580 A      8/1971
DE        26 19 769 A1     11/1977
(Continued)

OTHER PUBLICATIONS

International Preliminary Report on Patentability (PCT/IB/373) issued in PCT Application No. PCT/EP2016/076407 dated May 8, 2018, including English translation of document C2 (German-language Written Opinion (PCT/ISA/327) previously filed on May 8, 2018) (five (5) pages).
(Continued)

*Primary Examiner* — P. Macade Nichols
(74) *Attorney, Agent, or Firm* — Crowell & Moring LLP

(57) ABSTRACT

A pressure-limiting valve has a valve housing, a piston, a pressure-limiting adjustment spring, at least one inlet and at least one outlet. The piston can assume an open position in which the inlet and the outlet are connected to each other and a closed position which separates the inlet and outlet. A first piston ring has a sealing surface and has a small pneumatic active surface relative to a second piston ring. Between the first and second piston rings the piston has a substantially truncated cone-like portion which tapers toward the first piston ring. In the closed position, the sealing surface of the first piston ring is sealingly drawn against a housing collar by a pneumatic force acting counter to the force of the pressure-limiting adjustment spring. A pneumatic passage for creating a safety valve function closable by a spring-loaded safety valve body is provided in the piston.

12 Claims, 3 Drawing Sheets

(51) Int. Cl.
*B60T 15/50* (2006.01)
*F16K 17/04* (2006.01)
*B60T 17/00* (2006.01)

(56) References Cited

FOREIGN PATENT DOCUMENTS

| | | |
|---|---|---|
| DE | 26 20 135 A1 | 11/1977 |
| DE | 30 26 283 A1 | 2/1982 |
| DE | 33 11 816 C1 | 7/1984 |
| DE | 41 14 977 A1 | 11/1992 |
| DE | 42 16 247 A1 | 11/1993 |
| DE | 43 44 416 A1 | 6/1995 |
| DE | 600 24 496 T2 | 8/2006 |
| DE | 20 2006 017 517 U1 | 5/2007 |
| DE | 10 2006 033 429 A1 | 1/2008 |
| DE | 10 2007 054 760 B3 | 7/2009 |
| DE | 10 2008 053 994 A1 | 5/2010 |
| EP | 2 429 747 B1 | 4/2013 |
| GB | 1 278 305 A | 6/1972 |
| JP | 2013-142945 A | 7/2013 |
| JP | 2013-196399 A | 9/2013 |
| WO | WO 01/13017 A2 | 2/2001 |

OTHER PUBLICATIONS

German-language Office Action issued in counterpart German Application No. 102015118962.3 dated Jun. 29, 2016 (five (5) pages).
International Search Report (PCT/ISA/210) issued in PCT Application No. PCT/EP2016/076407 dated Mar. 17, 2017 with English translation (four (4) pages).
German-language Written Opinion (PCT/ISA/237) issued in PCT Application No. PCT/EP2016/076407 dated Mar. 17, 2017 (five (5) pages).
Japanese-language Office Action issued in counterpart Japanese Application No. 2018-522761 dated Jun. 3, 2019 with English translation (10 pages).
Hindi-language Office Action issued in counterpart Indian Application No. 201837017067 dated Oct. 18, 2019 with English translation (five pages).

* cited by examiner

PRESSURE-LIMITING VALVE

CROSS REFERENCE TO RELATED APPLICATIONS

This application is a continuation of PCT International Application No. PCT/EP2016/076407, filed Nov. 2, 2016, which claims priority under 35 U.S.C. § 119 from German Patent Application No. 10 2015 118 962.3, filed Nov. 5, 2015, the entire disclosures of which are herein expressly incorporated by reference.

BACKGROUND AND SUMMARY OF THE INVENTION

The present invention relates to a pressure-limiting valve comprising a valve housing, a valve piston with a pressure-limiting spring, wherein the pressure-limiting valve is, in particular, a pressure-limiting valve of an air treatment system for a brake system for a utility vehicle.

Air treatment systems for pneumatic brake systems, in which a safety valve for a reduced-pressure circuit for a pressure limiter is integrated, are known in connection with utility vehicles.

The air treatment arrangement is a central component in a pneumatic brake system of a utility vehicle, in which air treatment arrangement the oil- and water-containing air which is delivered by the compressor is filtered and cleaned. The compressed air is allocated, at the required pressure and in the correct filling order, to the various brake circuits and air consumers in the utility vehicle. In the event of a defect, the individual brake circuits are secured in relation to one another, so that an adequate auxiliary braking effect is available for braking the utility vehicle (for example a heavy goods vehicle). An electronic air treatment arrangement contains, in addition to a control electronics system, sensors and actuators. The most recent air treatment devices additionally also contain an electronic parking brake (EPB).

In this case, some of these brake circuits operate at a relatively low pressure level which lies below the pressure level of the other brake circuits.

In this case, the pressure can be reduced to the desired low level using a pressure-limiting valve. The desired pressure level can be adjusted by adjusting the force of the spring of the pressure limiter using an adjusting screw.

Different designs are known for pressure-limiting valves of this kind. The prior art discloses, in particular, pressure-limiting valves in accordance with the "pushing shut" principle, in which, in the event of an increase in pressure in the system, the pressure limiter closes at a defined closing pressure and thereby limits the outlet-side pressure. In the event of a further increase in pressure on the inlet side of the pressure limiter, said pressure limiter is pushed shut over an active face on the valve and the sealing force at the valve seat increases. A pressure-limiting valve of this kind is known, for example, from DE 10 2010 947 491 A1.

Further pressure-limiting valves are known from DE 33 11 816 C1, DE 26 20 135 A1, DE 41 14 977 A1, DE 30 26 283 A1, DE 26 19 769 A1, DE 26 19 769 A1, DE 600 24 496 D2 and DE 20 2006 017 517 U1, wherein these valves likewise operate in accordance with the "pushing shut" principle.

A further principle for pressure-limiting valves is the "pulling shut" principle, wherein, in the event of an increase in pressure in the system, the pressure limiter closes at a defined closing pressure and thereby limits the outlet-side pressure. In the event of a further increase in pressure on the inlet side of the pressure limiter, an active face on the piston generates a force which is introduced into the valve seat as tensile force by the piston. The sealing force at the valve seat is increased as a result.

DE 43 44 416 A1 discloses a pressure-limiting device which operates in accordance with the "pulling shut" principle. However, this pressure-limiting valve does not have a safety valve function.

Furthermore, it should be noted that the friction in a pressure-limiting valve should be as low as possible in order to keep the hysteresis of the pressure-limiting valve as low as possible. For this reason, sealing means are used in the pressure-limiting valves, said sealing means either being vulcanized-on or containing a pulled-on moulded seal. In order to safeguard the operating circuits, additional safety valves are installed. Said additional safety valves maintain the pressure in the operating circuits until the utility vehicle (for example a heavy goods vehicle) can stop. The safety valves require more installation space, and therefore more material for the valve block and more parts for assembly are required.

The object of the present invention is to advantageously develop a pressure-limiting valve of the kind outlined in the introductory part, in particular to the effect that it requires less installation space and furthermore can be manufactured at lower cost.

According to the invention, a pressure-limiting valve comprises a valve housing, a valve piston and a pressure-limiting adjusting spring, wherein at least one valve inlet and at least one valve outlet are provided in the valve housing, wherein the valve piston can assume an open position, in which the valve inlet and the valve outlet are connected to one another, and at least one closed position, in which the valve inlet and the valve outlet are separated from one another, wherein the valve piston has a first piston ring with a sealing face and has a second piston ring, wherein the first piston ring has a smaller pneumatic active surface than the second piston ring, and wherein the valve piston has, between the first piston ring and the second piston ring, a substantially truncated cone-like section which tapers in the direction of the first piston ring, wherein, in the closed position, the sealing face of the first piston ring is pulled in a sealing manner against a housing lip by a pneumatic force which acts on the first piston ring and second piston ring and which is directed against the force of the pressure-limiting adjusting spring, and wherein, furthermore, there is a pneumatic passage in the valve piston for the purpose of creating a safety valve function, which pneumatic passage can be closed by a spring-loaded safety valve body.

The invention is based on the basic idea that a safety valve is integrated in the pressure-limiting valve itself, so that an integrated safety valve function by the pressure-limiting valve is made possible. Furthermore, a pressure-limiting valve according to the "pulling shut" principle is selected since said pressure-limiting valve, in the event of the limit pressure at which the pressure-limiting valve should close being exceeded, pulls shut the valve piston and at the same time acts in a self-reinforcing manner. If a safety-critical pressure, which can likewise be pre-specified, is then further exceeded, said pressure, which triggers the safety valve function, can be reduced by the safety valve function. Owing to the integration of the safety valve function in the pressure-limiting valve itself, the installation space of the pressure-limiting valve is shared, and therefore separate installation space is not required for the safety valve. Furthermore, fewer parts are required since, owing to the integration of the safety valve in the pressure-limiting valve, a separate housing is no longer required for the safety valve for example.

Furthermore, it can be provided that the pressure-limiting adjusting spring is set on that side of the second piston ring which is averted from the first piston ring lying second piston ring. A particularly expedient introduction of the spring force, which is generated by the pressure-limiting adjusting spring, into the valve piston is achieved in this way. Furthermore, the lip which is formed by the second piston ring in any case can advantageously be used in order to mount the pressure-limiting adjusting spring on the valve piston. In this context, the body of the valve piston advantageously forms a kind of guide for the pressure-limiting adjusting spring.

Furthermore, it can be provided that only a portion of the radial face of the first piston ring is guided in the valve housing. The friction of the first piston ring in the valve housing can be reduced in this way. Furthermore, it is possible that the opening in the direction of the valve outlet, which opening is to be sealed off between the first piston ring and the valve housing, is restricted only to the gap between the first piston ring and the valve housing in the closed position.

Furthermore, it can be provided that the sealing face of the first piston ring is arranged in the radial face of the first piston ring. Simple and reliable sealing is made possible in this way. At the same time, this has the effect that the force which is required in order to lift away the first piston ring from the valve housing is comparatively low. It is also conceivable, for example, that, in the closed position, the sealing face of the first piston ring rests on an outer face of the valve housing.

It can also be provided that the sealing face of the first piston ring is formed by an O-ring and/or by a vulcanized-on sealing element. A simple and reliable sealing option is achieved in this way. Specifically, O-rings have the advantage that they can be readily exchanged. However, vulcanized-on sealing elements have the advantage that they can be fitted in a cost-effective and simple manner. However, both variants are comparatively simple and cost-effective to realize overall.

Furthermore, it can be provided that the second piston ring has a radial face which is guided in the valve housing, wherein a sealing ring is provided in the radial face. In this way, it is possible to be able to seal off the annular space, which is connected to the inlet and outlet of the pressure-limiting valve, to the outside in a simple manner in the interior of the valve housing.

The sealing ring can be formed by an O-ring and/or by a vulcanized-on sealing element.

Furthermore, it can be provided that the safety valve body is spring-loaded by the pressure-limiting adjusting spring. In this way, it is possible to be able to dispense with a separate spring for the safety valve body for the purpose of creating the safety valve function. The pressure-limiting adjusting spring can be used to adjust the pressure starting from which the safety valve body opens, in order to make the safety valve function possible.

In particular, it can be provided that the safety valve body, in a closed position, bears in a sealing manner against the sealing ring of the second piston ring. This embodiment has the advantage that it is of particularly small construction since the safety valve body bears directly against the second piston ring or is arranged in the immediate physical vicinity of the second piston ring.

The safety valve body can be guided in the valve housing. In this way, it is possible to define a defined relative movement of the safety valve body in the valve housing in a simple and reliable manner together with a low installation space requirement.

The safety valve body can be arranged in the interior of the valve piston. As a result, it is further possible to reduce the installation space required for the pressure-limiting valve.

It can also be provided that the safety valve body has a safety valve body sealing ring by which the pneumatic passage can be closed in a sealing manner in a closed position of the safety valve body.

Furthermore, it is possible that the safety valve body has a separate safety valve body spring which sets the safety valve body against the pneumatic passage in an open position of the safety valve body.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
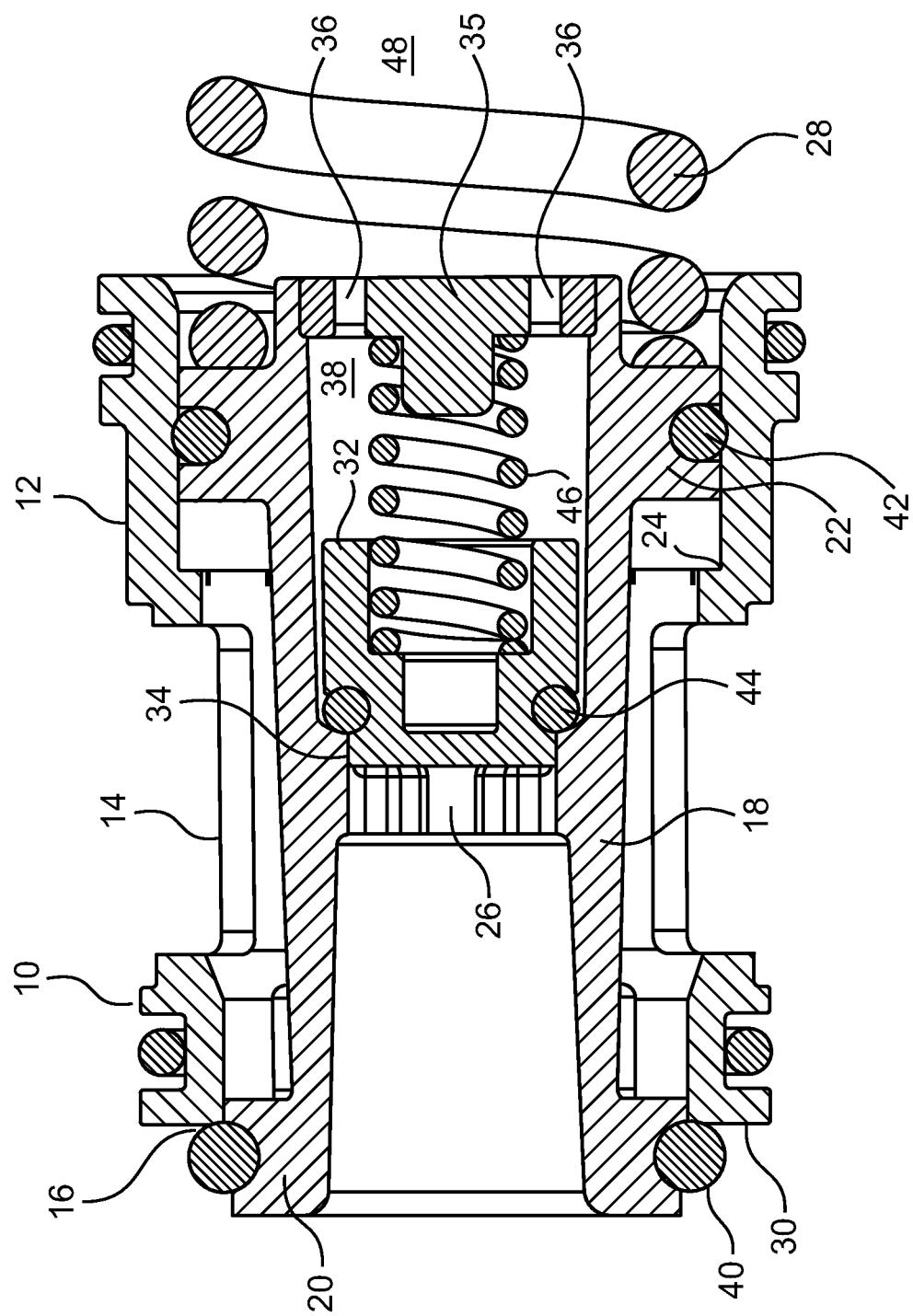
FIG. 1 shows a schematic sectional drawing of a first embodiment of an embodiment according to the invention of a pressure-limiting valve.

FIG. 1 shows a sectional illustration of a first embodiment of a pressure-limiting valve 10 according to the invention.

The pressure-limiting valve 10 is a pressure-limiting valve 10 in accordance with the "pulling shut" principle.

The pressure-limiting valve 10 has a valve housing 12 comprising a radially arranged valve inlet 14, a valve outlet 16 and a valve piston 18.

The valve outlet 16 is axially arranged and, in the closed position shown of the pressure-limiting valve 10, closed by a portion of the valve piston 18, specifically by the first piston ring 20.

In addition to the first piston ring 20, the valve piston 18 has a second piston ring 22.

The second piston ring 22 has, by way of one of its axial faces, specifically the axial face which faces the first piston ring 20, a pneumatically active face. For its part, this axial face is, in the open position of the pressure-limiting valve 10, also provided for moving toward the housing lip 24, as a result of which the maximum opening of the valve outlet 16 is defined.

A pneumatic passage 26, which is formed by as a centrally arranged passage bore, is provided in the valve piston 18.

The spring force of a pressure-limiting adjusting spring 28, the upper end of which is set against the second piston ring 22, acts on the valve piston 18.

The pressure-limiting adjusting spring 28 is therefore set against the second piston ring 22 on that side of the second piston ring 22 which is averted from the first piston ring 20.

The valve housing 12 has an outer stop 30 which is formed by an outer housing face and the inner edge of which jointly delimits the valve outlet 16.

In the interior of the valve piston 18, a safety valve body 32 is guided in a recess 38, it being possible to close the pneumatic passage 26 by said safety valve body.

In this recess 38, the valve body 18 also has a guide 34 into which a portion of the safety valve body 32 can engage. In the embodiment shown in FIG. 1 and in the position shown, the safety valve body 32 engages into the guide 34 or is guided in said guide.

The safety valve body can be a rotary part which is composed of plastic.

The recess 38 is closed by a stopper 35 at that end of the valve piston 18 which faces the pressure-limiting adjusting spring 28. This stopper 35 has through-passages 36 which serve to allow compressed air to pass through in connection with the safety valve function.

A sealing face 40 of the first piston ring 20 is arranged in the radial face of the first piston ring 20. The sealing face 40 of the first piston ring 20 can be formed by an O-ring (as shown) or by a vulcanized-on sealing element.

The second piston ring 22 has a radial face which is guided in the valve housing 12. A sealing ring 42 is provided in this radial face of the second piston ring 22.

As shown in FIG. 1, the sealing ring 42 can be formed by an O-ring or by a vulcanized-on sealing element.

In the position shown in FIG. 1, the valve outlet 16 is closed in a leaktight manner, specifically by the first piston ring 20 and the sealing face 40 of said first piston ring.

Only a portion of the radial face of the first piston ring 20 is guided in the valve housing 12, specifically that portion of the radial face of the first piston ring 20 which faces the valve housing. In the closed position, the sealing face 40 moves toward stop 30.

The sealing face 40 with a round or, for example, alternatively an oval cross section, formed either by an O-ring or by a vulcanized-on sealing element, is pulled toward the stop 30 in such a way that the gap which is located between the valve housing 12 and the first piston ring 20 is securely closed in a leaktight manner.

This is additionally further assisted by the elastic deformation of the sealing face 40.

The shaping of the sealing face 40 with the round or oval cross section also assists in the sealing face 40 bearing cleanly against the stop 30.

The annular space which is formed between the first piston ring 20 and the second piston ring 22 is sealed off in relation to the pressure-limiting adjusting spring 28 by the sealing ring 42.

Furthermore, the safety valve body 32 has a safety valve body sealing face 44 which, together with the safety valve body 32, closes off the pneumatic passage 26 in a sealing manner in the closed position. The safety valve body 32 therefore has a safety valve body sealing ring by which the pneumatic passage 26 can be closed off in a sealing manner or is closed off here, in the closed position shown.

The safety valve body 32 is spring-loaded by a spring 46 guided through the stopper 35 by way of one of its ends and through a recess 38 in the safety valve body 32 by way of its other end.

The spring 46 is a separate safety valve body spring 33 which sets the safety valve body 32 against the pneumatic passage 26 in a closed position of the safety valve body 32.

The valve piston 18 is of truncated cone-like design between the first piston ring 20 and the second piston ring 22, that is to say it has a substantially truncated cone-like section here.

This truncated cone-like section tapers starting from the second piston ring 22 in the direction of the first piston ring 20.

Owing to this increase in diameter, the first piston ring 20 acquires a smaller pneumatic active face than the second piston ring 22.

The through-passages 36 are connected to a safety valve outlet 48, not shown in any detail, which is located in the region of the pressure-limiting adjusting spring 28.

The functioning of the pressure-limiting valve 10 can be described as follows:

In the open state of the pressure-limiting valve 10 (not shown), compressed air, for example, flows across the valve inlet 14. The force which engages on the first piston ring 20 and the spring force of the pressure-limiting adjusting spring 28 ensure that the valve piston 18 is pushed against the housing lip 24 by way of the second piston ring 22 and as a result the valve inlet 14 is connected to the valve outlet 16.

If the compressed air flowing in across the valve inlet 14 exceeds a certain presettable limit pressure (the limit pressure being adjustable by the pressure-limiting adjusting spring 28 and, for example, a known adjusting element, such as an adjusting screw (not illustrated in any detail)), the resulting force produced from the different sizes of the pneumatically active faces of the first piston ring 20 and of the second piston ring 22 and also from the spring of the pressure-limiting adjusting spring 28 pushes the valve piston 18 against the direction of the spring force of the pressure-limiting adjusting spring 28, counter to the pneumatic force which acts on the pneumatically active face of the first piston ring 20 owing to the action of the compressed air. As a result, the sealing face 40 of the first piston ring 20 is pushed in a sealing manner against the stop 30 and the valve outlet 16 is closed in this way. As a result, the pressure on the other side of the valve outlet is limited to the limit pressure to which the pressure-limiting valve 10 is adjusted.

If, for example in the event of a fault, the pressure on the valve outlet side now exceeds a prespecified safety pressure, the safety function of the pressure-limiting valve 10 comes into effect. In this case, the applied pneumatic pressure pushes open the safety valve body 32, which is spring-loaded by the spring 46, and in this way opens the pneumatic passage 26. The compressed air can escape across the safety valve outlet 48 via the through passages 36.

Figure 2:
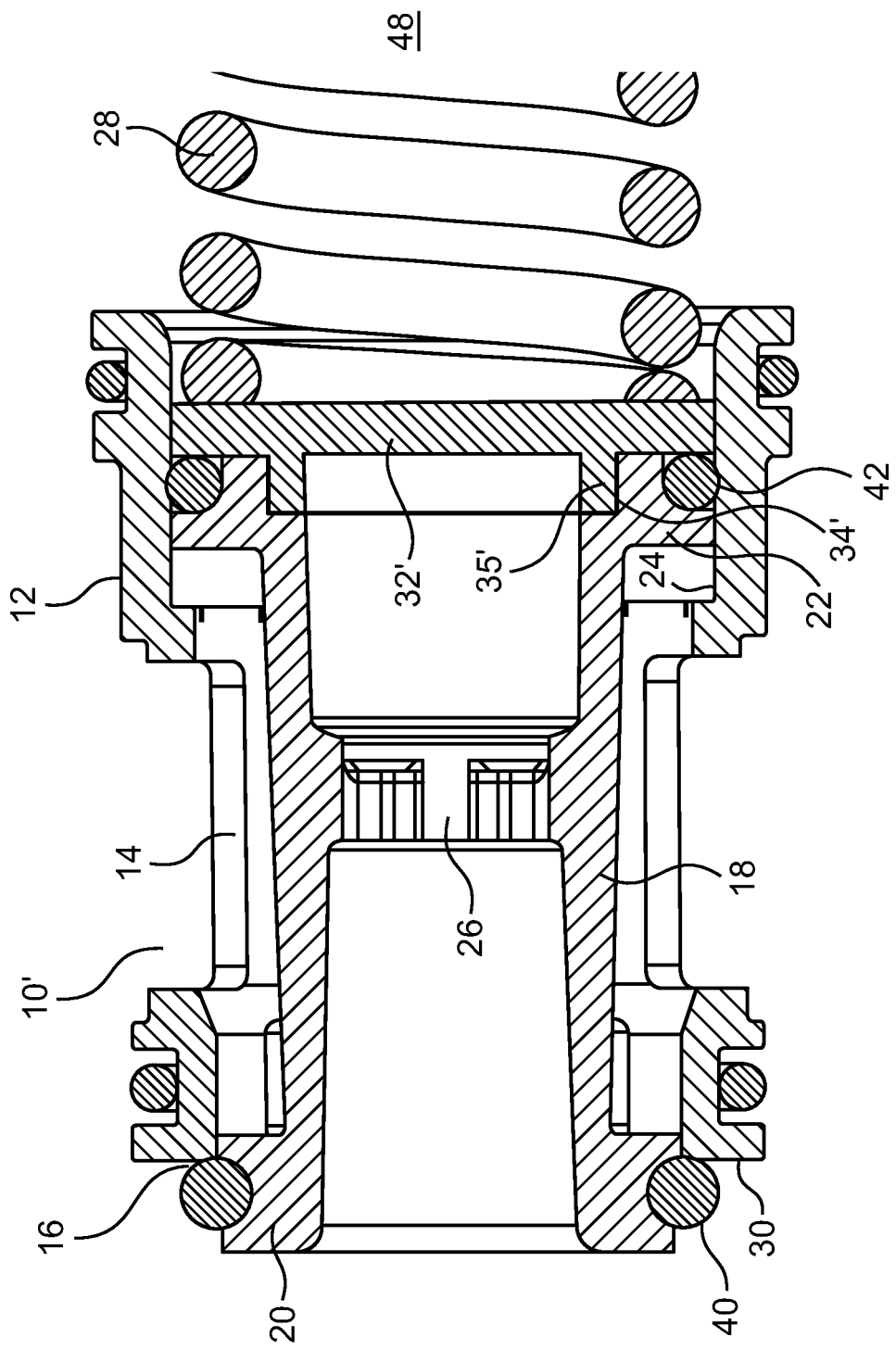
FIG. 2 shows a schematic sectional drawing of a second embodiment of an embodiment according to the invention of a pressure-limiting valve.

FIG. 2 shows a further embodiment of a pressure-limiting valve 10' according to the invention.

The pressure-limiting valve 10' substantially exhibits all of the structural and functional features of the pressure-limiting valve 10 shown in FIG. 1 and described above, however with the exception of the differences described below.

Identical elements are therefore identified by identical reference symbols.

However, the pressure-limiting valve 10' shown in FIG. 2 has the following differences:

A safety valve body 32' in the form of a sealing plate is provided instead of the stopper 35 and the separate spring 46.

The safety valve body 32' is directly spring-loaded by the pressure-limiting adjusting spring 28 and adjusted toward the second piston ring 22. Therefore, the safety valve body 32' is spring-loaded by the pressure-limiting adjusting spring 28.

In addition, the safety valve body 32' is guided in the valve housing 12.

Here, the second piston ring 22 also has a guide 34' in which a circumferential guide ring 35' is guided.

In this case, the safety valve body 32' is set against the second piston ring 22 in such a way that it can also be set directly against the sealing ring 42 at the same time in order to be able to close the pneumatic passage 26 in a sealing manner.

Therefore, in a closed position, the safety valve body 32' bears against the sealing ring 42 of the second piston ring 22 in a sealing manner.

Figure 3:
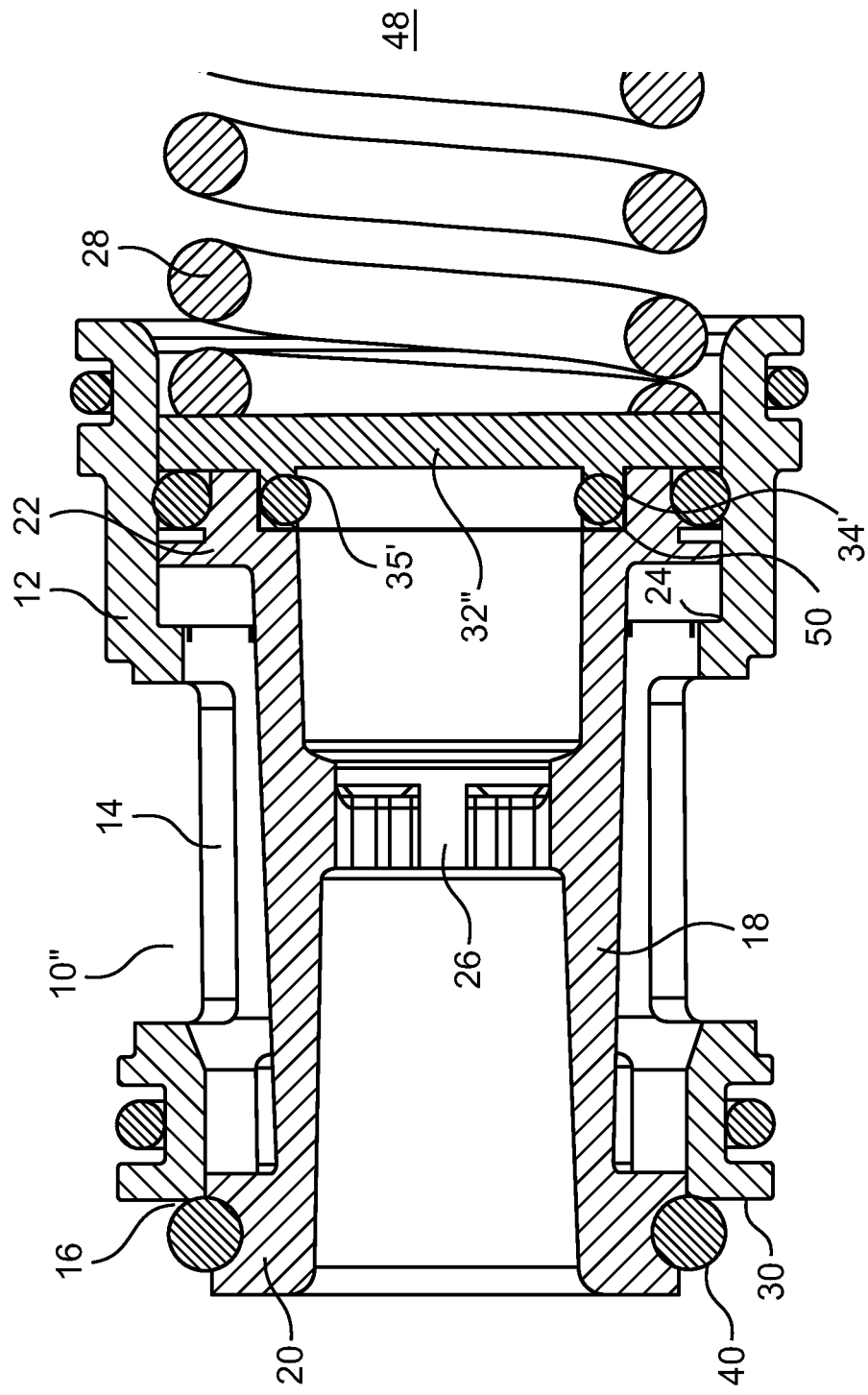
FIG. 3 shows a schematic sectional drawing of a third embodiment of an embodiment according to the invention of a pressure-limiting valve.

FIG. 3 shows a further embodiment of a pressure-limiting valve 10" which is virtually identical to the embodiment of the pressure-limiting valve 10' shown in FIG. 2.

The pressure-limiting valve 10" therefore exhibits substantially all of the structural and functional features of the pressure-limiting valve 10 and, respectively, 10' shown in FIGS. 1 and 2 and described above, however with the exception of the differences described below.

Here, an additional sealing ring 50 is additionally provided on the circumferential guide ring 35', said additional sealing ring sealing the safety valve body 32" against the second piston ring 22.

It is also conceivable in principle that the sealing ring 50 is held in the second piston ring 22.

The sealing ring 50 can be formed by an O-ring or by a vulcanized-on sealing element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Pressure-limiting valve
10' Pressure-limiting valve
10" Pressure-limiting valve
12 Valve housing
14 Valve inlet
16 Valve outlet
18 Valve piston
20 First piston ring
22 Second piston ring
24 Housing lip
26 Pneumatic passage
28 Pressure-limiting adjusting spring
30 Stop
32 Safety valve body
32' Safety valve body
32" Safety valve body
34 Guide
34' Guide
35 Stopper
35' Circumferential guide ring
36 Through-passage
38 Recess
40 Sealing face
42 Sealing ring
44 Safety valve body sealing face
46 Spring
48 Safety valve outlet
50 Sealing ring

What is claimed is:

1. A pressure-limiting valve comprising a valve housing, a valve piston and a pressure-limiting adjusting spring,
   wherein at least one valve inlet and at least one valve outlet are provided in the valve housing,
   wherein the valve piston can assume an open position, in which the valve inlet and the valve outlet are connected to one another, and at least one closed position, in which the valve inlet and the valve outlet are separated from one another,
   wherein the valve piston has a first piston ring with a sealing face and a second piston ring,
      the first piston ring has a pneumatic active surface smaller than a pneumatic active surface of the second piston ring,
      between the first piston ring and the second piston ring the valve piston has a truncated cone-shaped section which tapers in the direction of the first piston ring,
      in the closed position the sealing face of the first piston ring is pulled in a sealing manner against a housing lip by a pneumatic force acting on the first piston ring and second piston ring against a force of the pressure-limiting adjusting spring,
      the valve piston includes a pneumatic passage closable by a spring-loaded safety valve body, and
      wherein the pressure-limiting adjusting spring is set against the second piston ring on a side of the second piston ring opposite from the first piston ring.

2. The pressure-limiting valve as claimed in claim 1, wherein
   only a portion of a radial face of the first piston ring is guided in the valve housing.

3. The pressure-limiting valve as claimed in claim 2, wherein
   a sealing face of the first piston ring is arranged in the radial face of the first piston ring.

4. The pressure-limiting valve as claimed in claim 3, wherein
   the sealing face of the first piston ring is formed by at least one of an O-ring and a vulcanized-on sealing element.

5. The pressure-limiting valve as claimed in claim 4, wherein
   the second piston ring has a radial face which is guided in the valve housing, and
   a sealing ring is provided in the radial face of the second piston ring.

6. The pressure-limiting valve as claimed in claim 5, wherein
   the sealing ring in the radial face of the second piston ring is formed by at least one of an O-ring and a vulcanized-on sealing element.

7. The pressure-limiting valve as claimed in claim 6, wherein
   the safety valve body is spring-loaded by the pressure-limiting adjusting spring.

8. The pressure-limiting valve as claimed in claim 7, wherein
   when in a closed position, the safety valve body bears in a sealing manner against the sealing ring of the second piston ring.

9. The pressure-limiting valve as claimed in claim 8, wherein
   the safety valve body is guided in the valve housing.

10. The pressure-limiting valve as claimed in claim 1, wherein
    the safety valve body is arranged in an interior of the valve piston.

11. The pressure-limiting valve as claimed in claim 10, wherein the safety valve body has a safety valve body sealing ring configured to close in a sealing manner the pneumatic passage when the safety valve body is in a closed position.

12. The pressure-limiting valve as claimed in claim 11, wherein
the safety valve body has a safety valve body spring which biases the safety valve body against the pneumatic passage when the safety valve body is in a closed position.

* * * * *